Patented Nov. 8, 1927.

1,648,656

UNITED STATES PATENT OFFICE.

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY.

MANUFACTURE OF DISODIUM PHOSPHATE.

No Drawing. Application filed January 14, 1927. Serial No. 161,241.

Disodium phosphate as it at present universally appears on the market is in the form of a white, pure, crystallized solid containing twelve molecules of water of crystallization, its formula being $$Na_2HPO_4.12H_2O,$$

which shows, therefore, that it contains only about 19.9% $P_2O_5$.

If it be attempted to increase the $P_2O_5$ percentage of such solid by driving off water of crystallization, there is always the danger of forming a certain proportion of sodium pyrophosphate ($Na_4P_2O_7$), which is for many purposes not as desirable as the disodium orthophosphate.

The reason for the formation of this solid is that some of the water of combination is driven off at the same time as water of crystallization is driven off by heating, and, in fact, the formation of sodium pyrophosphate starts at slightly over 98° centigrade, and, so far as is known, no one has succeeded in preparing, by heating, a dehydrated disodium orthophosphate without at the same time producing at least traces of the pyro salt.

The usual process of preparing disodium orthophosphate $$(Na_2HPO_4.12H_2O)$$

is to treat dilute phosphoric acid, either pure or impure, which contains a sufficient excess of water, with sodium carbonate in the right proportion to produce the disodium salt, whereupon this solution is filtered, if necessary, to remove solid impurities, and then the $$Na_2PO_4.12H_2O$$

is allowed to crystallize out in various crystallizing devices, the crystals being washed and then filtered off and dried, whereupon there is obtained the ordinary disodium phosphate of commerce containing but 19.9% $P_2O_5$.

This pantentee has prepared a disodium phosphate in a very simple manner, which contains very materially more $P_2O_5$ content than the $$NaPO_4.12H_2O,$$

as it contains less water of crystallization, and in some cases practically no water of crystallization, and at the same time it contains no sodium pyrophosphate, unless it is subsequently heated to increase still further the $P_2O_5$ content, when it also may contain mere traces of sodium pyrophosphate.

This product may be prepared pure, or, in many cases, it may be satisfactorily placed on the market containing impurities present in the phosphoric acid, which are in many instances harmless for the purposes to which the disodium phosphate is put in commerce.

The general method by which this material is prepared by my improved and novel process is as follows:

Phosphoric acid of as great concentration as will permit of mixing in the required amount of soda ash is used, the actual concentration varying with the purity and temperature of the phosphoric acid, but, in any case, it will contain considerably less water than is necessary to form the $$Na_2HPO_4.12H_2O$$

and to this concentrated phosphoric acid there is added, in the form of a powder or dust, the required amount of soda ash to form the disodium salt, and the mixture, which forms a hot mass of rather high viscosity, and, in case the acid contains a certain amount of impurities which precipitate, is a rather thick slurry, is thoroughly stirred so that the reaction is completed.

This hot mass is then run into pans, where, after standing awhile, as it cools it crystallizes into a solid mass, which may be somewhat porous due to the presence of $CO_2$ generated by the reaction of the acid and soda ash.

There may also be present some undecomposed soda ash, if a little excess of this is employed, or the reaction has not quite been completed.

Such solidified mass is thereupon removed from the pans, or it may be loosened from the pans while it is somewhat hot to make its removal easy, and it is then ground into any size particles it is desired to make, by any of the usual methods and apparatus for grinding.

This improved and novel process of producing disodium phosphate has a number of marked advantages, since it gives a higher salt content than the usual method employed, it is cheaper to prepare and furnishes a material which is not necessarily pure, where a pure product is not required, hence obviating the necessity of removing impurities, and consequently cheapening the process.

In this way a salt can be prepared containing any desired amount of $P_2O_5$ above 19.9% up to 40% and over, and if it is actually desired to make the pure, anhydrous salt containing 50% $P_2O_5$, this original product may be completely dehydrated by heating just as in the usual method, in which case there probably will be present a mere trace of the pyrophosphate.

The preferred method of preparing the salt referred to is as follows:

A charge consisting of twelve hundred parts by weight of commercial phosphoric acid of about 60° Baumé, such as is shipped ordinarily in commerce, containing about 53 to 54% by weight of $P_2O_5$, is introduced into a wooden stirring tank provided with a paddle, and to this is added a slight amount of water, say, between two hundred and four hundred parts by weight, depending on what analysis of the final product is desired, and then, with constant stirring, one thousand parts by weight of soda ash are added.

This mass is then thoroughly stirred, there is a considerable evolution of $CO_2$, and the precipitation of the impurities in the phosphoric acid occurs.

Such mass becomes hot and thickens considerably, so that in order to assure that all of the lumps are well broken up, the charge is discharged continuously through a small paste mill such as is used in the paint industry, and is delivered directly into an iron pan, in which it is allowed to cool off and become crystallized.

It is well, however, for the sake of ease and facility in removing it from the pan, to loosen it somewhat from the bottom while the mass is still slightly soft, and upon such removal, in the form of hard, crystallized material, it is introduced into a cage mill or hammer mill and ground to whatever fineness is desired.

In this way, a product is economically produced containing between 30% and 40% $P_2O_5$, depending upon the amount of water added to the phosphoric acid at the start.

The product may contain a slight deficiency of sodium below that required to form the disodium salt, or it may contain an excess of soda ash to any degree preferred, but this depends on the use to which the product is to be put and affects in no way the principle of the method of preparation.

If pure phosphoric acid has been used to prepare this salt, the analysis, of course, will be higher than if the product contains the impurities originally present in commercial phosphoric acid, but, for many of the uses of disodium phosphate, such as boiler-water treatment, these impurities are of no consequence, and the commercial acid may be used to advantage.

The product is, therefore, a disodium phosphate containing less than twelve molecules of water of crystallization and which may have present in it the impurities present in the materials from which it is prepared; and the process by which such material is produced is the treatment of phosphoric acid of such concentration that in combination with the required amount of soda ash and subsequent cooling, it will set to a solid mass which can be disintegrated and shipped for use in the industries, the concentration of the acid varying considerably, depending on the product which it is desired to produce, in regard to the content of $P_2O_5$ and the degree of purity required.

I claim:

1. In the process of making disodium phosphate, mixing together phosphoric acid, a sodium salt of an acid more volatile than phosphoric acid, and less water than is necessary to form $$Na_2HPO_4.12H_2O,$$

and permitting the product to cool and harden.

2. In the process of making disodium phosphate, mixing together phosphoric acid, soda ash, and less water than is necessary to form $$Na_2HPO_4.12H_2O,$$

and cooling the product in a pan.

3. In the process of making disodium phosphate, mixing together phosphoric acid, a sodium salt of an acid more volatile than phosphoric acid, and less water than is necessary to form $$Na_2HPO_4.12H_2O,$$

cooling the product in a pan, and loosening it from the pan during the cooling operation.

4. In the process of making disodium phosphate, mixing together phosphoric acid, soda ash, and less water than is necessary to form $$Na_2HPO_4.12H_2O,$$

cooling the product in a pan, loosening it from the pan during the cooling operation, and grinding the cooled product.

5. In the process of making disodium phosphate, mixing together approximately 1200 parts by weight of commercial phosphoric acid of about 60° Baumé and containing in the neighborhood of 53% by weight of $P_2O_5$, about 200 to 400 parts by weight of water, and approximately 1000 parts by weight of soda ash, and cooling the resulting product.

6. In the process of making disodium phosphate, mixing together approximately 1200 parts by weight of commercial phosphoric acid of about 60° Baumé and containing in the neighborhood of 53% by weight of $P_2O_5$, about 200 to 400 parts by weight of water, and approximately 1000 parts by weight of soda ash, discharging the mass continuously through a paste mill, and delivering it into a pan for cooling and crystallization.

7. In the process of making disodium phosphate, mixing together approximately 1200 parts by weight of commercial phosphoric acid of about 60° Baumé and containing in the neighborhood of 53% by weight of $P_2O_5$, about 200 to 400 parts by weight of water, and approximately 1000 parts by weight of soda ash, passing the resulting mass through a paste mill and discharging it into a pan for cooling and crystallization, loosening the mass from such pan while it is still slightly soft, and grinding the hard crystallized material to the required fineness.

In witness whereof I have hereunto set my hand.

HERBERT H. MEYERS.